US007761673B2

(12) United States Patent
Gao et al.

(10) Patent No.: US 7,761,673 B2
(45) Date of Patent: *Jul. 20, 2010

(54) COMPLIER ASSISTED VICTIM CACHE BYPASSING

(75) Inventors: Yaoqing Gao, North York (CA); William E. Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/355,019

(22) Filed: Jan. 16, 2009

(65) Prior Publication Data

US 2009/0132767 A1 May 21, 2009

Related U.S. Application Data

(63) Continuation of application No. 11/381,563, filed on May 4, 2006, now Pat. No. 7,506,119.

(51) Int. Cl.
*G06F 12/00* (2006.01)
(52) U.S. Cl. .................................... 711/162
(58) Field of Classification Search ........................ None
See application file for complete search history.

(56) References Cited

U.S. PATENT DOCUMENTS 7,363,463 B2 *   4/2008   Sheu et al. .................. 711/203

2006/0112233 A1 * 5/2006 Hu et al. .................. 711/138
2006/0179231 A1 * 8/2006 Briggs et al. .............. 711/136
2007/0088915 A1   4/2007 Archambault et al.
2007/0283098 A1  12/2007 O'Brien et al.

OTHER PUBLICATIONS

Roger Espasa et al.; "A Victim Cache for Vector Registers;" Conference Proceedings of the 1997 International Conference on Supercomputing Vienna, Austria; Jul. 7-11, 1997; pp. 293-300.
Gokhan Memik et al.; "Reducing Energy and Delay Using Efficient Victim Caches;" ISLPED'03 Proceedings of the 2003 International Symposium on Low Power Electronics and Design; Seoul, Korea; Aug. 25-27, 2003; pp. 262-265.
Norman P. Jouppi; "Improving Direct-Mapped Cache Performance by the Addition of a Small Fully Associative Cache and Prefetch Buffers;" The 17th Annual International Symposium on computer Architecture Conference Proceedings; Seattle, Washington; May 28-31, 1990; pp. 364-373.

* cited by examiner

*Primary Examiner*—Matt Kim
*Assistant Examiner*—Hamdy S Ahmed
(74) *Attorney, Agent, or Firm*—Cantor Colburn LLP; Libby Toub

(57) ABSTRACT

A method for compiler assisted victim cache bypassing including: identifying a cache line as a candidate for victim cache bypassing; conveying a bypassing-the-victim-cache information to a hardware; and checking a state of the cache line to determine a modified state of the cache line, wherein the cache line is identified for cache bypassing if the cache line that has no reuse within a loop or loop nest and there is no immediate loop reuse or there is a substantial across loop reuse distance so that it will be replaced from both main and victim cache before being reused.

2 Claims, 3 Drawing Sheets

```
#define N 0x10000000
double A[N];
double B[N];
for (i = 0; i < N; i ++)   {
    A[ i ] = B [ i ];
}
```

FIG. 2

COMPLIER ASSISTED VICTIM CACHE BYPASSING

CROSS-REFERENCE TO RELATED APPLICATIONS

This application is a continuation of U.S. patent application Ser. No. 11/381,563 filed May 4, 2006, the disclosure of which is incorporated by reference herein in its entirety.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field

The present invention generally relates to caching in a processor and more particularly to a complier assisted victim cache bypassing system.

2. Description of Related Art

Before the invention of caches, several machines implemented forms of dynamic scheduling in order to avoid stalling when a memory access was encountered. The two most notable examples were the CDC 6600 with its scoreboard and the IBM 360/91 with its Tomasulo Algorithm, which were introduced in the late 1960's. Dynamic scheduling, which entails rearranging the order of instructions in hardware during execution of the program while maintaining the semantics of the original program order, was found to be extremely complex, expensive, hard to debug, and hard to test. Therefore, during the 1970's and 1980's, no other dynamically scheduled machines were produced at IBM. Similarly, dynamic scheduling was also abandoned at CDC. Furthermore, other manufacturers did not produce dynamically scheduled processors during that period.

Shortly after the introduction of the CDC 6600 and the IBM 360/91, computer systems using cache memory were developed. In those systems, as in modern computers, most memory accesses by a processor are satisfied by data in cache memory. Since the cache can be accessed much more quickly than main memory, the need for dynamic scheduling was also reduced.

In order to reduce processor stalling when a cache miss is encountered, some microprocessor manufacturers have reintroduced dynamical scheduling in their processors in recent years. A dynamically scheduled processor will try to find other instructions that do not depend on the data being fetched from the missing load, and execute these other instructions out-of-order and in parallel with the cache miss. Significantly higher performance can thus be obtained.

In recent years, processor cycle times have decreased greatly, and the capacity of memory chips has increased significantly. While cache access time has decreased along with processor cycles, the access time of memory chips has changed in a much slower pace. This has led to an increasing gap between cache access times and main memory access times.

For example, in the late 1970's, a VAX 11-780 would only slow down 50% if its cache was turned off and if it executed out of main memory. Today, main memory access times can be more than 100 cycles, and programs could slow down by more than 100 times if they fetched each instruction and data reference from main memory instead of cache. Even when an instruction or data reference is occasionally accessed from main memory, the small amount of cache misses can still greatly slow down program execution because of the long memory access times.

Several modern multiprocessor systems employ victim caches to improve the performance of the main caches. A victim cache stores cache lines evicted out of its main cache. If the main cache needs the same line later, it can quickly load the line from the victim cache, which is much faster than loading it from main memory. However, it is not always the case that a line in the victim cache will loaded back to the main cache. Moving such a line into the victim cache unnecessarily increases contention on system resources and unnecessarily increases power consumption. Allowing the line to bypass the victim cache and to be directly written back memory would provide better performance.

SUMMARY

Disclosed is a method for compiler assisted victim cache bypassing including: identifying a cache line as a candidate for victim cache bypassing; conveying a bypassing-the-victim-cache information to a hardware; and checking a state of the cache line to determine a modified state of the cache line, wherein the cache line is identified for victim cache bypassing if the cache line that has no reuse within a loop or loop nest and there is no immediate loop reuse or there is a substantial across loop reuse distance so that it will be replaced from both main and victim cache before being reused.

Also disclosed herein is a computer program product for compiler assisted victim cache bypassing, the computer program product including: a storage medium readable by a processing circuit and storing instructions for execution by the processing circuit for facilitating a method including: identifying a cache line as a candidate for victim cache bypassing; conveying a bypassing-the-victim-cache information to a hardware; and checking a state of the cache line to determine a modified state of the cache line, wherein the cache line is identified for victim cache bypassing if the cache line that has no reuse within a loop or loop nest and there is no immediate loop reuse or there is a substantial across loop reuse distance so that it will be replaced from both main and victim cache before being reused.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

TECHNICAL EFFECTS

As a result of the summarized invention, technically we have achieved a solution that avoids polluting the victim cache, reduces the number of accesses to the victim cache, and results in significant reduction in energy consumption of the victim cache.

BRIEF DESCRIPTION OF THE SEVERAL VIEWS OF THE DRAWINGS

The invention will be better understood from the following detailed description with reference to the drawings, in which:

FIG. 2 illustrates an exemplary copy loop; and

DETAILED DESCRIPTION

Figure 1:
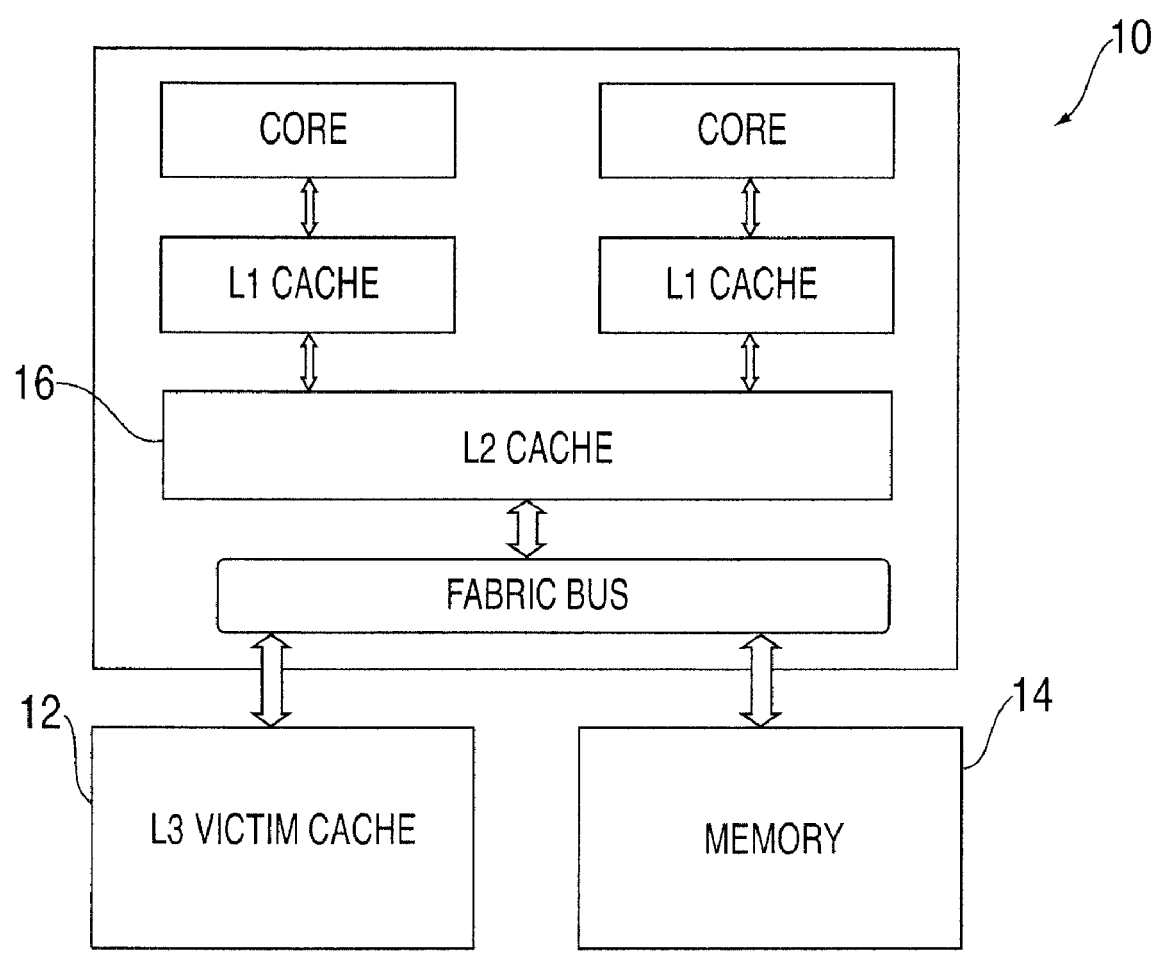
FIG. 1 illustrates a processing system 10 with a large off-chip victim cache.

The present invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention in detail. The examples used herein are intended merely to facilitate an understanding of ways in which the invention may be practiced and to further enable those of skill in the art to practice the invention. Accordingly, the examples should not be construed as limiting the scope of the invention.

Referring now to FIG. 1, a processing system 10 with a large off-chip victim cache 12 is illustrated. In general, victim cache is a cache used to hold blocks evicted from a CPU cache due to a conflict or capacity miss. In exemplary embodiments, the victim cache 12 may be between the main cache and its refill path, and may only hold blocks that were evicted from that cache on a miss. The victim cache 12 enhances utilization of cache capacity because inclusion need not be maintained. In one embodiment, the victim cache 12 and the system memory 14 have distinct data paths, which better accommodates the bandwidth requirements of a larger numbers of on-die processors and increased levels of hardware found in multithreading systems. In the processing system 10, when an L2 cache 16 replaces a cache line, it sends the cache line to the victim cache 12. If the L2 cache 16 needs the same cache line later, it can quickly load it from the victim cache 12, which is much faster than loading it from the memory 14. However, it is not always the case that a cache line in the victim cache 12 will be loaded back to the L2 cache 16. The same cache line may simply never be used again or needed after it is displaced out of the victim cache.

To further clarify the existing victim caches designs, consider an example that copies an array of data from one memory location to another.

With the traditional victim cache, when a main cache line of array A and array B is replaced, it will be sent to the victim cache and because the line will never be accessed again, it will stay in the victim cache until replaced. When the victim cache replaces a line of array A, it has to write the line to memory because the loop modifies array A. When the victim cache replaces a line of array B, it simply drops the line because the loop does not modify array B. Moving array A and array B into the victim cache gives no benefit whatsoever. Instead, it only increases contention on the victim cache, increases energy consumption of the victim cache, and possibly pollutes the victim cache by replacing other useful lines.

This disclosed method enables a main cache to selectively allow replaced lines to bypass its victim cache. In an exemplary embodiment, when a line is chosen to bypass the victim cache, it will be directly written back to memory if it is in a modified state or it will be silently invalidated if it is not in a modified state. Applying this method to a copy loop 20 illustrated in FIG. 2, array A will be directly written back to memory from main cache and array B will be silently dropped in main cache. Neither array A or array B will be written to the victim cache, which avoids polluting the victim cache, reduces the number of accesses to the victim cache, and results in significant reduction in energy consumption of the victim cache.

The method includes performing advanced analysis to determine what data structures to bypass the victim cache and then pass the information to the hardware. In one embodiment, a complier preforms the advanced analysis. In exemplary embodiments, the compiler infrastructure comprises inter-procedure context-sensitive pointer analysis, context-insensitive escape analysis, data affinity analysis, reuse, dependency and shape analysis, array delinearization, stream identification and classification, static and dynamic profile analysis, data reorganization, and loop locality transformation.

In exemplary embodiments, there are two sources of data reuse: temporal reuse (i.e., multiple accesses to the same memory location) and spatial reuse (i.e., accesses to nearby memory locations that share a cache line or a block of memory at some level of the memory hierarchy). Additionally, it is also possible to have different levels of reuse (e.g., innermost loop reuse, loop nest reuse, and across loop nest program reuse). Besides data locality and reuse analysis within innermost loop and loop nest, work data size for each loop and loop nest is estimated and reuse distances are gathered. Based on the global information, a set of stream candidates for bypassing the victim cache for each loop is identified. A stream is marked as a candidate for bypassing the victim cache if (i) its cache line has no reuse within the loop or loop nest and there is no immediate loop reuse or (ii) there is a substantial across loop reuse distance so that it will most likely be replaced from both main and victim cache before being reused.

There are multiple ways for compilers to convey bypassing-the-victim-cache information to the hardware. In one embodiment, a special bit is added in load/store instructions, indicating whether or not the corresponding line should bypass the victim cache. The special bit can be saved in the main cache tag array or a special table that stores the address of lines that will bypass the victim cache. In another embodiment, the special bit is encoded into the page table entries and passed from the effective-to-physical address translation hardware to main cache. In yet another embodiment, the compiler conveys bypassing-the-victim-cache information to the hardware by extending the prefetch engine to explicitly request main cache to flush lines that identified by the compiler that have no temporal locality. However, this approach works only on streams that are predicted by the prefetch engine.

In one embodiment, the compiler conveys bypassing-the-victim-cache information to the hardware by using a small bypass table attached to main cache. The table contains the starting address and the length of memory regions that should bypass the victim cache. The compiler chooses these memory regions after thorough and comprehensive analyses. In one embodiment, a special LS (Load-Store) instruction can be used to write the starting address and the length of each of these regions to the bypass table right before the region is being accessed. In an alternative embodiment, the bypass table can be mapped to a special memory space, allowing software to manage it. If a main cache deals with physical address exclusively, the compiler will generate corresponding instructions for each physical page of each region.

Figure 3:
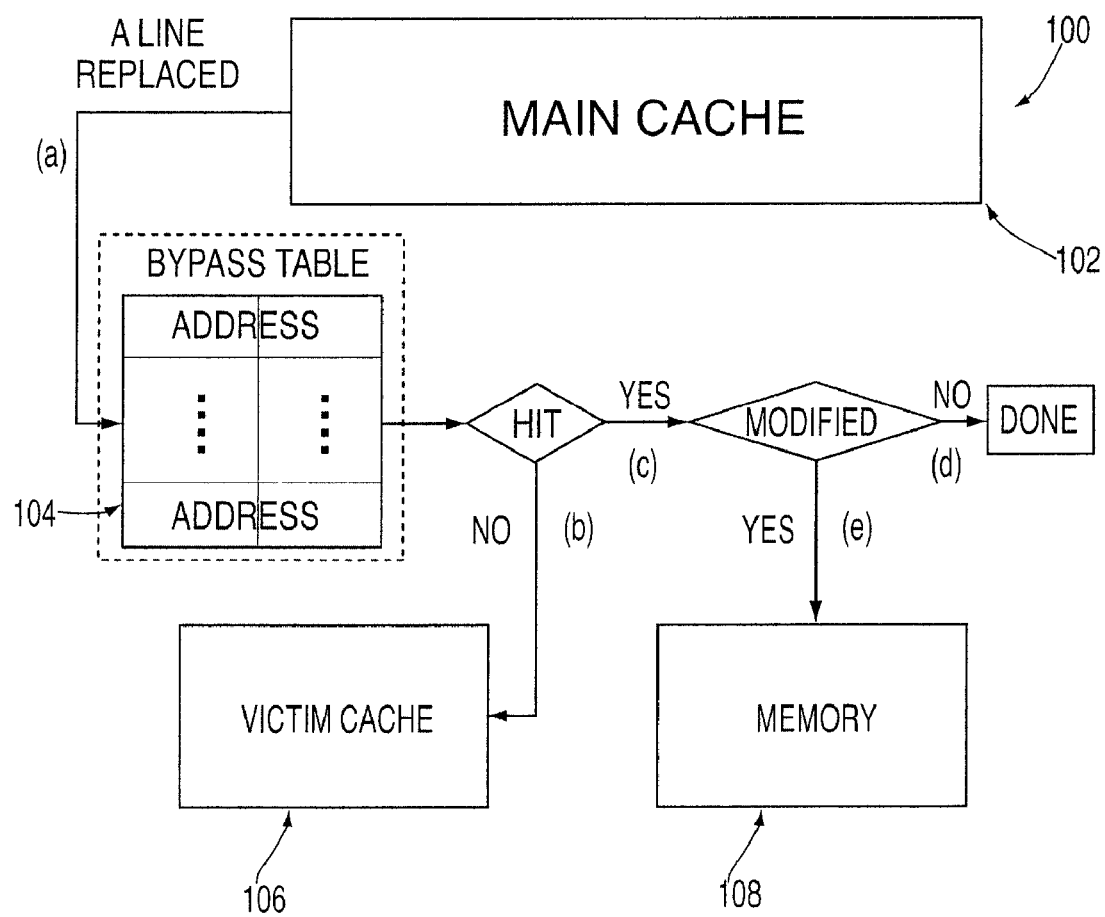
FIG. 3 illustrates a flow chart of main cache replacement with a bypass table in accordance with exemplary embodiments.

Turning now to FIG. 3, a flow chart of main cache replacement with a bypass table is illustrated generally as 100. When a main cache 102 replaces a line, it first checks the bypass table 104. If the address of the replaced line does not match any entry in the bypass table 104, the line will be sent to a victim cache 106. If it matches an entry of the bypass table 104, the state of the line is checked. If the line is not in a modified state, the main cache does nothing else. If the line is in a modified state, it will be written back to a memory 108.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer system for compiler assisted victim cache bypassing, the system comprising:
   a processor;
   a main cache operatively coupled to the processor
   a victim cache operatively coupled to the processor and configured to receive instructions evicted from the main cache due to at least one of a conflict and a capacity miss,
   wherein the processor is configured for:
   identifying a cache line as a candidate for victim cache bypassing;
   conveying a bypassing-the-victim-cache information to a hardware by one of the following:
   adding a special bit to load/store instructions, indicating whether or not the corresponding line should bypass the victim cache, wherein the special bit can be saved in a main cache tag array or a special table that stores the address of lines that bypass the victim cache;
   encoding the special bit is encoded into page table entries and passing the special bit from an effective-to-physical address translation hardware to main cache;
   conveying bypassing-the-victim-cache information to hardware by extending a prefetch engine to explicitly request the main cache to flush lines that identified by the compiler that have no temporal locality; and
   conveying bypassing-the-victim-cache information to the hardware via a small bypass table attached to main cache, the bypass table including a starting address and a length of memory regions that should bypass the victim cache, wherein a special LS (Load-Store) instruction is implemented to write the starting address and the length of each of the regions of the memory to the bypass table before the region is accessed; and
   checking a state of the cache line to determine a modified state of the cache line,
   wherein the cache line is identified for victim cache bypassing if the cache line that has no reuse within a loop or loop nest and there is no immediate loop reuse or there is a substantial across loop reuse distance so that it will be replaced from both main and victim cache before being reused,
   wherein the loop reuse is at least one of temporal reuse in which there are multiple accesses to a same memory location, and spatial reuse in which there are accesses to nearby memory locations that share at least one of a cache lines and a block of memory at a level of a memory hierarchy.

2. A computer system for compiler assisted victim cache bypassing, the system comprising:
   a processor;
   a main cache operatively coupled to the processor
   a victim cache operatively coupled to the processor and configured to receive instructions evicted from the main cache due to at least one of a conflict and a capacity miss,
   wherein the processor is configured for:
   identifying a cache line as a candidate for victim cache bypassing;
   conveying a bypassing-the-victim-cache information to a hardware by one of the following:
   adding a special bit to load/store instructions, indicating whether or not the corresponding line should bypass the victim cache, wherein the special bit can be saved in a main cache tag array or a special table that stores the address of lines that bypass the victim cache;
   encoding the special bit is encoded into page table entries and passing the special bit from an effective-to-physical address translation hardware to main cache;
   conveying bypassing-the-victim-cache information to hardware by extending a prefetch engine to explicitly request the main cache to flush lines that identified by the compiler that have no temporal locality; and
   conveying bypassing-the-victim-cache information to the hardware via a small bypass table attached to main cache, the bypass table including a starting address and a length of memory regions that should bypass the victim cache, wherein a special LS (Load-Store) instruction is implemented to write the starting address and the length of each of the regions of the memory to the bypass table before the region is accessed;
   checking a state of the cache line to determine a modified state of the cache line; and
   writing the cache back to a memory if the cache line is in a modified state;
   wherein the cache line is identified for victim cache bypassing if the cache line that has no reuse within a loop or loop nest and there is no immediate loop reuse or there is a substantial across loop reuse distance so that it will be replaced from both main and victim cache before being reused, conveying the bypassing-the-victim-cache information to the hardware includes using a bypass table, and bypass table includes a starting address and a length of a memory region that should bypass the victim cache
   wherein the loop reuse is at least one of temporal reuse in which there are multiple accesses to a same memory location, and spatial reuse in which there are accesses to nearby memory locations that share at least one of a cache lines and a block of memory at a level of a memory hierarchy.

* * * * *